United States Patent [19]
Kovacec

[11] 3,712,344
[45] Jan. 23, 1973

[54] STRIP CUTTING UNIT FOR LOOMS

[76] Inventor: Viktor Kovacec, Lainzerstrasse 45, Vienna, Austria

[22] Filed: July 7, 1971

[21] Appl. No.: 160,535

Related U.S. Application Data

[63] Continuation of Ser. No. 839,333, July 7, 1969, abandoned.

[30] Foreign Application Priority Data

July 23, 1968 Austria ................................. A 7137

[52] U.S. Cl. .................................... 139/11, 242/56.2
[51] Int. Cl. ............................................. D03d 49/00
[58] Field of Search ..139/11; 83/425, 433, 651, 658, 83/700; 242/56,2, 56.3, 56.4, 56.5, 56.6

[56] References Cited

UNITED STATES PATENTS

| R23,875 | 9/1954 | Speed et al. | 242/56.5 |
| 2,310,153 | 2/1943 | Rosenfarb | 242/56.2 |
| 2,343,720 | 3/1944 | Van Norde | 242/56.4 |
| 2,384,288 | 9/1945 | Eddy | 242/56.2 |
| 3,292,477 | 12/1966 | Raftery | 83/658 |
| 3,359,844 | 12/1967 | Comet | 83/435 |

FOREIGN PATENTS OR APPLICATIONS

| 740,926 | 11/1932 | France | 242/56.2 |
| 1,035,227 | 7/1966 | Great Britain | 139/11 |
| 79,315 | 11/1918 | Switzerland | 83/433 |

*Primary Examiner*—Henry S. Jaudon
*Attorney*—McGlew and Toren

[57] ABSTRACT

The present invention provides a loom for making netting from strips of plastics material and a novel cutting unit for use therewith. The cutting unit has a number of mutually parallel blades arranged in a channel in a beam and is disposed in the path of a sheet of plastics material as it enters the loom in order to cut it into strips.

5 Claims, 2 Drawing Figures

PATENTED JAN 23 1973

3,712,344

INVENTOR.
VIKTOR KOVACEC

BY McGlew and Toren
ATTORNEYS

STRIP CUTTING UNIT FOR LOOMS

This application is a continuation of application Ser. No. 839,333, now abandoned.

The invention relates to a loom, particularly an automatic one, for making netting from narrow strips of plastics in a leno weave, wherein a supply reel containing uncut plastic sheeting is arranged in front and adjoined by a stationary cutting unit with an assembly of parallel blades which cut the plastic sheet being fed into the machine into narrow strips which form the warp; it also relates to an associated cutting unit for cutting the plastic sheeting fed into the loom into narrow strips to form the warp.

In the past, agricultural products of all types have generally been packed in sacks with a close weave or else in sacks made of jute or cotton netting. However, these materials are not resistant to weather conditions or to chemicals; cotton for example is very sensitive to humidity. Recently, therefore, the practice has been to pack such products in net sacks or bags made from narrow strips of plastics, which are woven in looms specially equipped for the purpose.

The starting material for the warp threads which have to be interwoven is a preferably prestretched sheet of plastics which has not yet been cut into strips. The thickness of the sheet if preferably about 20$\mu$ or less. The weft threads are always formed by monoaxially prestretched strips of plastics.

The looms which have been used in the past for making such sacks of plastic material, and the finished products made therewith, are not technically or economically satisfactory.

According to the invention looms, particularly automatic ones, of the above type for making netting from narrow strips of plastics can advantageously be designed, so that the cutting unit is arranged in the loom at the point of entry of the sheet of plastics — preferably below it — and substantially includes a mechanical cutter comprising a cutting beam and a cutting assembly which is sunk into a recess in the said beam and has parallel projecting blades, the cutter assembly preferably being vertically adjustable within the beam.

Further according to the invention, the unit fitted in the loom for cutting the plastic sheeting is constructed, so that the beam of the cutter contains an open top channel-like guide extending over its whole length and accommodating the vertically adjustable cutter assembly. The cutter assembly itself comprises a bar containing a groove, into which distance pieces and blades are inserted alternately; this "packeted" cutter assembly can be fixed at the desired level by means of two clamping plates screwed onto the two ends of the beam. It is advisable for the two longitudinal walls of the guide for the cutter assembly, provided in the beam of the cutter, to be covered with plastic sheeting, in order to protect the as yet unused parts of the blades which are in contact therewith.

In a preferred embodiment of the cutting unit the cutter is immediately followed by two rollers covered with foam material, which loosely engage the strips emerging from the cutter to form the warp; these rollers serve to align the warp strips and also provide a means for catching any broken threads.

An example of a loom according to the invention for making netting from thin strips of plastics is illustrated in the accompanying drawings, in which:

FIG. 2 is a large scale cross section through one embodiment of the special cutting unit (20) which is inserted in the FIG. 1 loom at II, in order to cut the sheet of plastics into strips as it is fed in.

Figure 1:
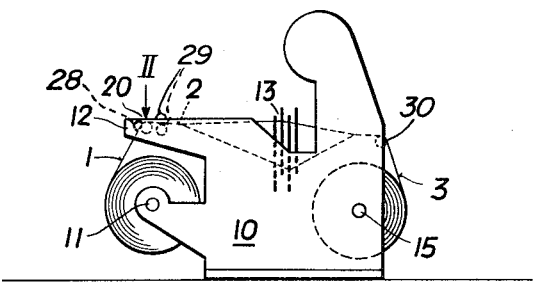
FIG. 1 shows the whole automatic loom (10) diagrammatically.

Referring now to FIG. 1, the automatic loom for making netting comprises a bed plate or loom frame 10, which supports a supply reel 11 containing uncut plastic sheeting 1 — for example polyolefins sheeting — which may either be unstretched or possibly monoaxially pre-stretched. Further towards the point 12 where the plastic sheet 1 is fed in — i.e. at II, the loom contains a unit with a mechanical cutter 20, by means of which the sheeting 1 is slit into warp threads or strips 2 in the form of narrow strips, the construction of the cutting unit is shown below in FIG. 2. In the weaving frame or weaving area 13, the warp threads 2 are interlaced with weft threads (not shown) in a so-called leno or gauze weave to form a netting 3; and the finished netting 3 is finally wound onto the cloth beam 15 at the delivery side of the loom.

Figure 2:
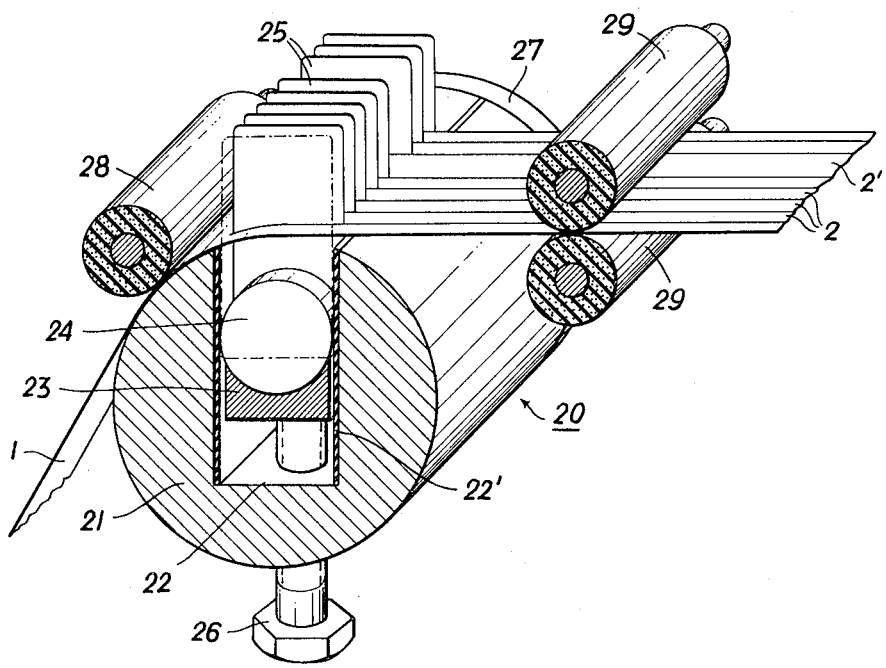

FIG. 2 shows one embodiment of the cutting unit which is mounted stationary in the loom 10, after the point of entry 12 of the plastic sheeting 1, with its associated mechanical cutter 20: the cutter 20 itself substantially comprises a cylindrical cutting beam 21 containing an open top channel-like guide 22 extending over its whole length and containing a comb-like cutter assembly 23–25 which is vertically displaceable. The assembly consists of a bar 23 containing an open-top channel like guide or a groove, within which distance pieces 24 alternate with upright blades 25. Clamping plates 27 are screwed onto both ends of the beam 21 and enable the packeted cutter assembly 23–25 to be fixed at the desired level in the guide 22; this may be adjusted by set screws 26. And finally, it is advantageous for the two longitudinal walls of the guide 22 in the beam 21 to be covered with a sheet 22' of plastics, in order to protect the, as yet unused, parts of the blades 25 which are in contact with it. The sheet 1 of plastics being fed into the machine is held against the beam 21 by means of a roller 28 which is loosely applied thereto and which should desirably be covered with a foam material. In this cutting unit, the actual cutter 20 is adjoined by two loosely rotating shafts 29—29, which engage both sides of the already formed warp threads 2— being fed to the weaving frame 13 — and thus provide an appropriate means for catching any broken threads.

Guide roll means on the weaving frame 13 for guiding the sheet material to the cutter means 20 (25) and for guiding the woven material to the finished cloth beam include sheet material guide rollers 21, 28 and 29 as well as woven material guide roller 30.

I claim:

1. A loom comprising, a loom frame, a plastic sheet material supply reel rotatably mounted on said frame, a finished cloth beam for said frame for receiving woven material, a weaving area located between said supply reel and said frame, cutter means on said frame for cutting said plastic sheet material onto individual warp strips, guide roll means on said frame for guiding the sheet material to said cutter means and for guiding the woven material to said finished cloth beam, said cutter means comprising a cylindrical cutting beam supported between said supply reel and said weaving area and having an open-top channel-like guide extending along its length and a portion of the cylindrical surface forming a guide surface over which the plastic sheet is directed, a cutter bar in said channel having an axially extending receiving groove, a plurality of alternatively arranged cutting blades and disc pieces in said groove, said blades projecting outwardly from said bar and being located in the path of movement of said sheet to cut said sheet to form said warp strips, and clamping means for holding said cutting blades and disc pieces together on said bar.

2. A loom, according to claim 1, wherein said cutting blades may be adjusted vertically.

3. A loom, according to claim 2, including a clamping plate on at least one end of said beam comprising said clamping means, said cutting blades being adjustable in a vertical direction and being clamped in a selected vertical position by said clamping means.

4. A loom, according to claim 1, including a liner in said channel of a soft material for protecting the cutting blades.

5. A loom, according to claim 1, wherein said guide roll means includes a pair of foam covered roller elements, located between said cutter means and said weaving frame engageable with the newly cut warp threads.

* * * * *